United States Patent
Teblyashkin et al.

(10) Patent No.: US 7,266,844 B2
(45) Date of Patent: Sep. 4, 2007

(54) HEURISTIC DETECTION OF POLYMORPHIC COMPUTER VIRUSES BASED ON REDUNDANCY IN VIRAL CODE

(75) Inventors: Ivan Teblyashkin, Aylesbury (GB); Igor Muttik, Berkhamsted (GB); Viatcheslav Peternev, Aylesbury (GB)

(73) Assignee: McAfee, Inc., Santa Clara, CA (US)

( * ) Notice: Subject to any disclaimer, the term of this patent is extended or adjusted under 35 U.S.C. 154(b) by 239 days.

(21) Appl. No.: 09/963,659

(22) Filed: Sep. 27, 2001

(65) Prior Publication Data

US 2003/0061502 A1  Mar. 27, 2003

(51) Int. Cl.
*G06F 11/00* (2006.01)
(52) U.S. Cl. .......................................... 726/24; 713/188
(58) Field of Classification Search ................ 713/200, 713/188; 726/24
See application file for complete search history.

(56) References Cited

U.S. PATENT DOCUMENTS

| | | | | | |
|---|---|---|---|---|---|
| 5,367,619 | A | * | 11/1994 | Dipaolo et al. | 715/506 |
| 5,398,196 | A | * | 3/1995 | Chambers | 714/28 |
| 5,471,629 | A | * | 11/1995 | Risch | 707/201 |
| 5,826,013 | A | | 10/1998 | Nachenberg | |
| 6,357,008 | B1 | * | 3/2002 | Nachenberg | 713/200 |
| 2002/0073330 | A1 | * | 6/2002 | Chandnani et al. | 713/200 |
| 2002/0078368 | A1 | * | 6/2002 | Yann et al. | 713/200 |

* cited by examiner

*Primary Examiner*—Emmanuel L. Moise
*Assistant Examiner*—Kevin Schubert
(74) *Attorney, Agent, or Firm*—Zilka-Kotab, PC; Christopher J. Hamaty

(57) ABSTRACT

Computer programs are analysed for the occurrence of redundant program instructions of program instruction using uninitialised variables. If the number of such instructions exceeds a threshold level, then the computer program is treated as containing a computer virus. This technique is useful in identifying new and polymorphic viruses.

21 Claims, 10 Drawing Sheets

| Involved Instructions | Values | Dependence | | | | | |
|---|---|---|---|---|---|---|---|
| | | a | b | c | d | (ext) | (flags) |
| [1] | #1 | 1 | | | | ↑ | set |
| [2] | #2 | | | | | 1 | zero |

↙ 2

| | Initialized | | | | |
|---|---|---|---|---|---|
| | a | b | c | d | (flags) |
| | 1 | 1 | | | |

↙ 4

Load b, #2

FIG. 2

|  | Dependence | | | | | | |
|---|---|---|---|---|---|---|---|
| Values | {w} {r} | a | b | c | d | (ext) | (flags) |
| #1 | | 1 | | | | | |
| #2 | 1←1 combine | | | | | [Set write = Op (Set read)] | |

| Involved Instructions |
|---|
| [1] [3] |
| [2] [3] |

2

| Initialized | | | | |
|---|---|---|---|---|
| a | b | c | d | (flags) |
| 1 | 1 | | | |

| Involved Instructions | Values | {w} {r} a b c d (ext) (flags) Dependence {r} |
|---|---|---|
| [1] [3] | #1 | |
| [2] [3] | #2 | 1 ↓ |
| [4] [5] | #3 | 1 ↓ combine |

2 ↗

$a = a + c$

| | a b c*d (flags) Initialized |
|---|---|
| | 1 |

Amended FIG. 6

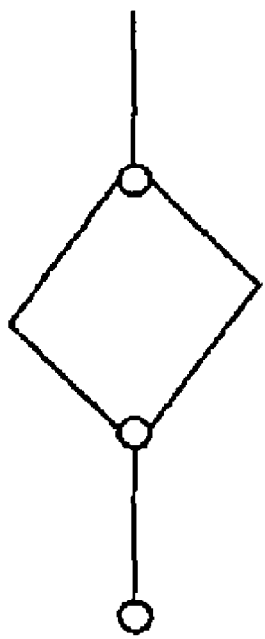
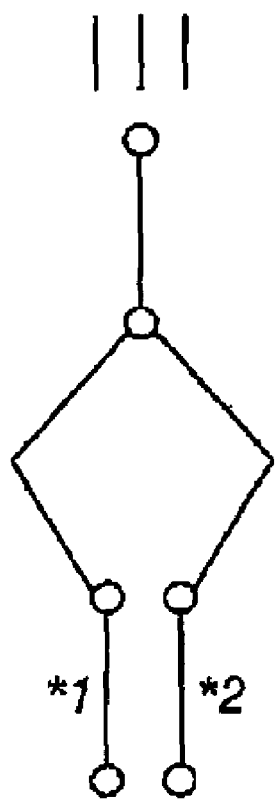
FIG.9b

HEURISTIC DETECTION OF POLYMORPHIC COMPUTER VIRUSES BASED ON REDUNDANCY IN VIRAL CODE

BACKGROUND OF THE INVENTION

1. Field of the Invention

This invention relates to data processing systems. More particularly, this invention relates to the detection of computer viruses.

2. Description of the Prior Art

It is known to provide anti-virus computer programs that detect computer viruses by detecting known characteristics of particular computer viruses. These known characteristics are usually known code sequences or known types of processing activity. Whilst such an approach is successful and efficient for the majority of computer viruses, it is generally only effective against computer viruses that are already known or are highly similar to known viruses. This is particularly the case in the instance of polymorphic viruses which serve to continuously change their code to have different code sequences in different generations of the virus.

SUMMARY OF THE INVENTION

Viewed from one aspect the present invention provides a computer program product for controlling a computer to detecting an executable computer program containing a computer virus, said computer program product comprising:

analysis logic operable to analyse program instructions forming said executable computer program to identify suspect program instructions being one or more of:

(i) a program instruction generating a result value not used by another portion of said executable computer program; and (ii) a program instruction dependent upon an uninitialised variable; and detecting logic operable to detect said executable computer program as containing a computer virus if a number of suspect program instructions identified for said executable computer program exceeds a threshold level.

The invention recognizes that computer viruses, and particularly polymorphic viruses, often contain a significant amount of redundant or ridiculous code. The invention exploits this recognition by analysing the computer program within which computer viruses are being detected to see if the level of such redundant or ridiculous code exceeds a threshold level. Redundant code will typically be program instructions producing result values that are not used by any other portion of the computer program. Ridiculous code may be code which operates upon uninitialised variables as this will generally not produce meaningful processing results. Identifying computer viruses in this way helps to find unknown viruses and new polymorphic viruses. The technique also helps to identify the location of virus code within an executable program since the virus code will contain a high proportion of redundant or ridiculous code.

As previously mentioned, the technique can be used to detect viruses of various different forms, but is particularly well suited to detecting polymorphic computer viruses which are otherwise difficult to detect.

A particularly efficient way of detecting redundant code is to maintain a dependence table indicating dependency between state variables within the computer and loaded variable values. In this way, a program instruction may be analysed to see which state variables it writes to and which state variables it reads from and accordingly a dependence drawn up that may be used to determine if there are values that are redundant within the code indicating corresponding redundant program instructions.

The state variables of the computer can take a variety of forms, but preferably include one or more of register values, processing result flag values (such as overflow flags, zero flags etc) and a flag indicative of a write to a non-register storage location (such as a write to memory or other storage device).

A similar approach to the dependence table can be used to track initialisation of variables using an initialisation table.

In preferred embodiments a state variable may be regarded as initialised if a write of a determined initialised value is made to that state variable or if use of that state variable is made as a memory address by a program instruction (this may be taken as indicative of a parameter having been passed to the code in question via what otherwise appears as an uninitialised variable).

It will be appreciated that the processing flow through a computer program can take a variety of forms. In particular, it is common for branches to occur within a processing flow. A sequence of instructions that might appear redundant or ridiculous when one branch is followed may not appear in the same light when another branch is followed. Accordingly, preferred embodiments of the invention operate by following the execution flow and upon occurrence of a branch first following a first branch path having saved pending analysis results and subsequently returning to follow a second branch path having restored the pending analysis results.

The following of a branch path may be advantageously terminated when there are no further suitable program instructions for execution (e.g. invalid instructions or a block of zeros etc) within that branch path or the branch path rejoins a previously parsed execution path.

Viewed from further aspects the invention also provides a method of detecting computer viruses and an apparatus for detecting computer viruses.

The above, and other objects, features and advantages of this invention will be apparent from the following detailed description of illustrative embodiments which is to be read in connection with the accompanying drawings.

FIGS. 1 to 5 schematically illustrate a sequence of program instructions and their analysis using dependence and initialisation tables;

FIG. 6 is a flow diagram schematically illustrating the routine applied to each instruction in order to identify redundant code or code operating using uninitialised values;

FIGS. 7, 8 and 9A and 9B schematically illustrate the parsing of computer program with various branching and rejoining structures; and FIG. 10 schematically illustrates a general purpose computer of the type which may be used to implement the above described techniques.

DESCRIPTION OF THE PREFERRED EMBODIMENTS

FIG. 1 illustrates a dependence table 2 and an initialisation table 4. The dependence table 2 includes a column for each register a, b, c, d within a processor, a column for an external write and a column for a write to the flag values relating to processing operations. The dependence table 2 has a plurality of rows with each row corresponding to a new value loaded into the computer that influences its state.

The initialisation table 4 contains a single row indicating at any point in time which registers have been initialised and whether the processing flag values have been initialised.

In the tables illustrated a theoretical processor having only four registers a, b, c, d is illustrated. It will be appreciated that in general terms many more registers would typically be provided and an example alternative system would be to follow the register model of the x86 processor family, including the interdependence of some registers.

In FIG. 1, the program instruction being illustrated is one which loads a value #1 to the register a. Within the dependence table 2 this program instruction has the result of creating a new row corresponding to the value #1. The column corresponding to the register a is marked with a 1 to indicate that this register value is dependent upon the value #1. In addition, the program instruction concerned, as indicated by its address value [1], is marked as associated with the value #1. Within the initialisation table 4, the column corresponding to register a is marked with a 1 to indicate that this register has been initialised.

FIG. 2 illustrates a subsequent instruction which loads the register b with a value #2. This creates another new row within the dependence table 2 within which the entry for register b is set to a 1. The instruction address [2] of the instruction concerned is recorded in connection with the value #2. As the register b is being loaded with a new value this also has the effect of clearing any previously set dependencies for the register b within the dependence table 2. Accordingly, within the column corresponding to the register b, all entries in preceding rows are reset to 0. Within the initialisation table 4, the initialisation of the register b is also marked.

FIG. 3 illustrates a third instruction which serves to read the values currently held within the registers a and b, add these together and write the result back to the register a. The present technique analyses which state variables are read by a particular operation and produces so-called read-mask that can be applied to each row in turn within the dependence table 2 to select those values which affect the result of the operation. A similar analysis is performed to produce a write-mask, which determines what state variables are written by the operation. All state variables from the write-mask (i.e. written by the operation) are marked as dependent upon only those values from table 2 that previously had dependency with the state variables from the read-mask (i.e. read by the operation). Dependencies between other values from table 2 and state variables from the write-mask are cleared.

In the example illustrated, both registers a and b are read whilst only register a is written. Accordingly, in the case of the first row within the dependence table 2, no change is made since register a is already dependent upon value #1. The instruction [3] is however added to the list of instructions associated with that row, i.e. the value #1. In the case of the second row, the mask value for state variable reads indicates that there is a dependence upon value #2 for this operation and accordingly all of the state variables written by this operation should now be marked as dependent upon #2. Thus, register a is marked with a 1 to indicate that by virtue of this program instruction there now exists a dependence between the value #2 and the value held within the register a. Instruction [3] is also added to the list of instructions involved with the second row. In the case of the program instruction concerned with FIG. 3 no new state variables are initialised and so no changes are made to the initialisation table 4 with this program instruction. No dependencies with 'a' have ceased because no row corresponds to a value that is not read by the operation, so, no cells are turned to '0' in column 'a'.

FIG. 4 illustrates a further instruction that loads a value #3 into register a. As for the instruction discussed in relation to FIG. 2, this in an analogous manner serves to set the column value corresponding to register a within a new row corresponding to value #3 whilst setting to zero all of the values in the preceding rows corresponding to register a as whatever dependence they may have had upon those preceding values has now been overwritten. This has the effect that the entire row corresponding to the value #1 now has zeros at every position indicating that there is no remaining state variable within the system that is dependent upon the value #1. This indicates that all those instructions that were involved in processing operations upon the value #1 were involved with a redundant variable and accordingly should be regarded as suspect program instructions.

It will be appreciated that a computer program which is not a computer virus may contain a small number of suspect program instructions due to programming errors or artefact of compilation or other processing. However, computer virus code typically contains many more such suspect instructions, particularly in the case of polymorphic viruses, and accordingly comparison with a user set or predetermined threshold level can be used to trigger an anti-virus response. The threshold level may be made dependent upon the size of the computer program being analysed as one would normally expect that even within non-virus computer programs the number of suspect program instructions would generally increase for a large computer program compared with a small computer program.

FIG. 5 illustrates a further program instruction that serves to read the contents of the registers a and c, add these together and then write the result to register a. The generation of a read mask and a write mask is carried out in the same way as described in relation to FIG. 3 with these masks then being applied in turn to each of the rows within the dependence table 2. In the particular example illustrated, this instruction makes no change in the values set within the dependence table 2 as the value within register a is already dependent upon value #3 and since register c has not been initialised it cannot produce a new dependent upon a loaded value.

It will be appreciated that since register c has not been initialised and yet is being used as a read value within instruction [5], this program instruction may immediately be marked as suspect. The suspect nature of instruction [5] will not be altered by subsequent processing within this path and accordingly involved instructions do not need to be recorded and updated in status on an ongoing basis as for the dependence table 2. Register a may also be marked as uninitialised (i.e. the "1" is cleared) since it has just been loaded with data that is not meaningful, i.e. the data from uninitialised register c.

It will be appreciated that in the examples of FIG. 3 and FIG. 5, the flag values have not been shown as being updated with the add instructions. In practice most architectures will update the flags with such add instructions and in these cases appropriate entries will be made within a row with the flags being treated as a state variable that is written to in dependence upon a particular value as managed by the write mask previously discussed.

In the case of the dependence table 2, there is a column corresponding to external writes. An instruction that makes an external write, such as a store to a memory location, will cause a value to be set to 1 within this column when there is a dependence upon the value for that column. Compared with the columns corresponding to registers, the flag values within the external write columns are not overwritten when a farther external write takes place as this external write may be to a different location or the value that had previously been written could have been used by another process and so it is not correct to assume that it is removed from dependency.

FIG. 6 is a flow diagram illustrating the processing involved with the above described technique as applied to each instruction. This processing is followed for each program instruction within the computer program being analysed. At step 6 a determination is made as to whether or not a new value is being loaded into a register. If a new value is being loaded, then processing proceeds to step 8 at which a new dependence table row is created. At step 10 all the elements within that row that are being written to by the load in question are set to a value 1. A write mask may be calculated for the instruction concerned in order to determine which values should be set in this way. At step 12 all the values for state variables being written by the current program instruction within preceding rows within the dependence table 2 are set to a value of 0 since the loading of the new value will have overwritten any dependency they previously had. At step 14 those state variables written to by the program instruction concerned are marked as initialised within the initialisation table 4. Processing then terminates.

If the determination at step 6 was that a new value was not being loaded, then processing proceeds to step 16 at which a write mask is determined to identify all the state variables being written to by that instruction. Step 18 similarly determines a read mask corresponding to all the state variables being read by that instruction. Step 20 then selects the first row within the dependence table 2. At step 22 all elements within the current row that are being written to by the program instruction concerned as determined at step 16 are set to a value of 1 if any element being read by the instruction as determined by step 18 is a 1 for the row in question or set to '0' otherwise. This can be viewed in another way as setting the values for any of the state variables identified by the write mask if any value is set for the existing state variables as identified by the read mask or clearing the values otherwise. At step 24, the next row is selected. Step 26 then determines if any more unprocessed rows within the dependence table 2 has remained. If the last row has not been processed, then processing returns to step 22. If the last row has been processed, then processing proceeds to step 28. Step 28 determines whether any of the elements which were identified within the read mask were uninitialised. If any such element(s) is identified, then processing proceeds to step 30 at which one or more heuristic hits are marked and written state variables are set uninitialised and independent on any value from table 2. Processing then terminates. If the determination at step 28 was that no uninitialised state variables were read, then processing terminates without passing through step 30.

Depending upon the number of heuristic hits recorded for a computer file under test, a threshold level may be exceeded that indicates the computer file as possibly containing a computer virus and accordingly triggers the application of further virus detecting tests to the computer file to confirm the presence of a virus. The technique can in this case act a a prefilter to avoid spending unnecessary time scanning non-suspicious code for computer viruses.

FIG. 7 schematically illustrates the parsing of a computer program that contains multiple program branches. When each branch is encountered a saved version of the current dependence table 2 is stored as table 4. One of the two branch paths is then followed until it terminates, in this case the end of the branch or last relevant instruction for each branch being reached. When each branch terminates in this way, the currently produced dependence table at that point is merged into the final overall result and then parsing returns to the immediately preceding branch point with the dependence and initialisation tables being restored to the state that was buffered at that immediately preceding branch point. The processing then proceeds to analyse the instructions down that second branch path until they also terminate. Eventually, all of the paths within the computer program have been parsed and the dependence tables reached at the end of each path will have been merged into the overall result which gives a count of the suspect program instructions for that computer program that can be compared with a threshold value to identify potential computer viruses.

FIG. 8 illustrates an alternative topology for the parsing. In this case a conditional jump to another part of code is encountered. At that point the tables are buffered and a marker inserted at the target point. When parsing reaches the marked point, then the current tables are merged with previously buffered tables and both current and buffered versions of tables are updated with the new merged variant.

FIG. 9B illustrates a further topology in which two different paths may reach a common point. These are treated as separate branches within a topology such as FIG. 7.

In the case of a call type topology, subroutines are noted when encountered without being parsed at that time, but with the initialised variable table 4 being buffered for later uses with that subroutine. Further calls to that subroutine will merge in their associated initialisation table 4 at that point with that already buffered. When the main routine has been parsed, processing proceeds to consider the subroutine using the buffered (and possibly merged) initialised variable table 4.

Figure 1:
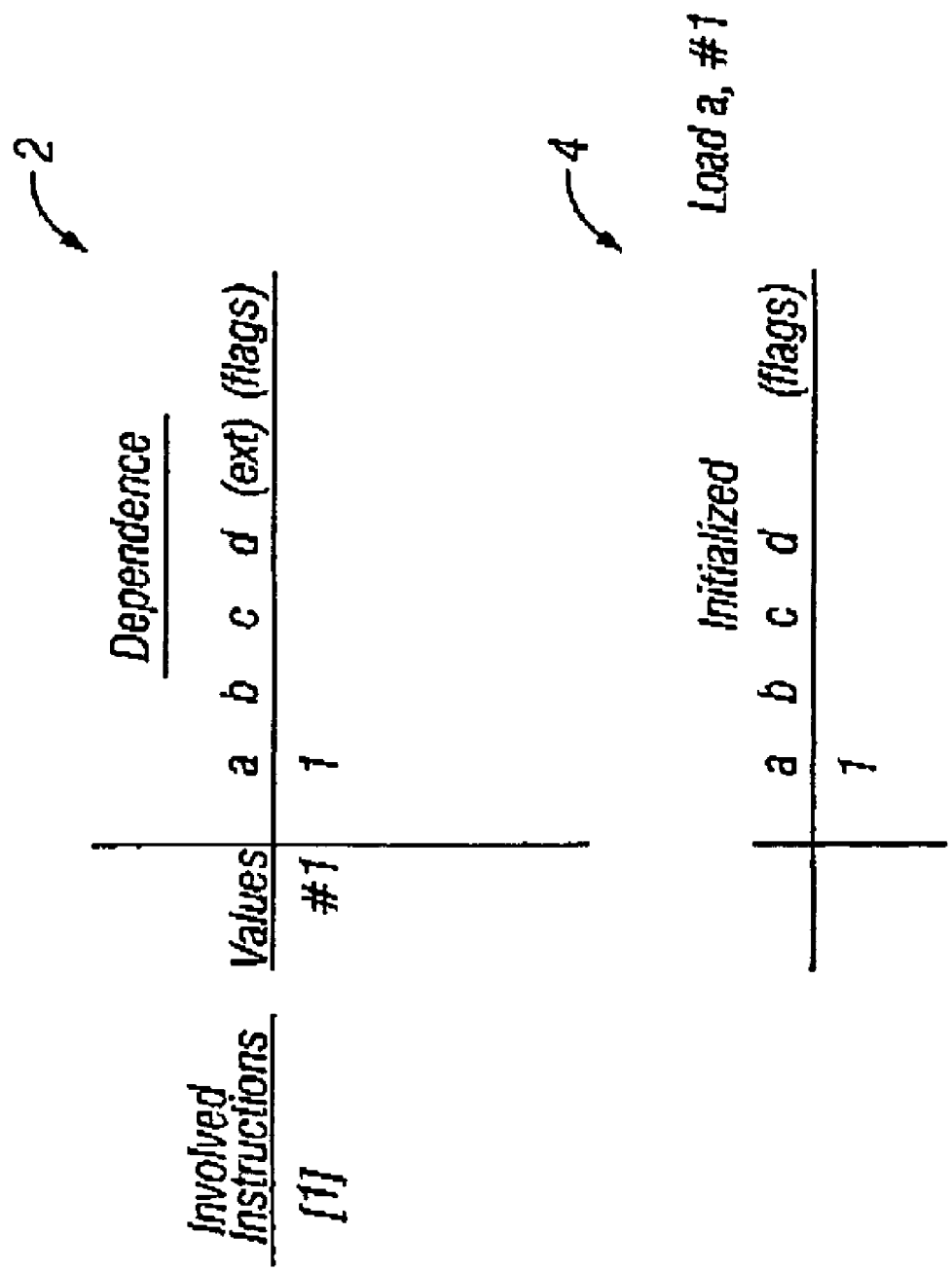
Figure 4:
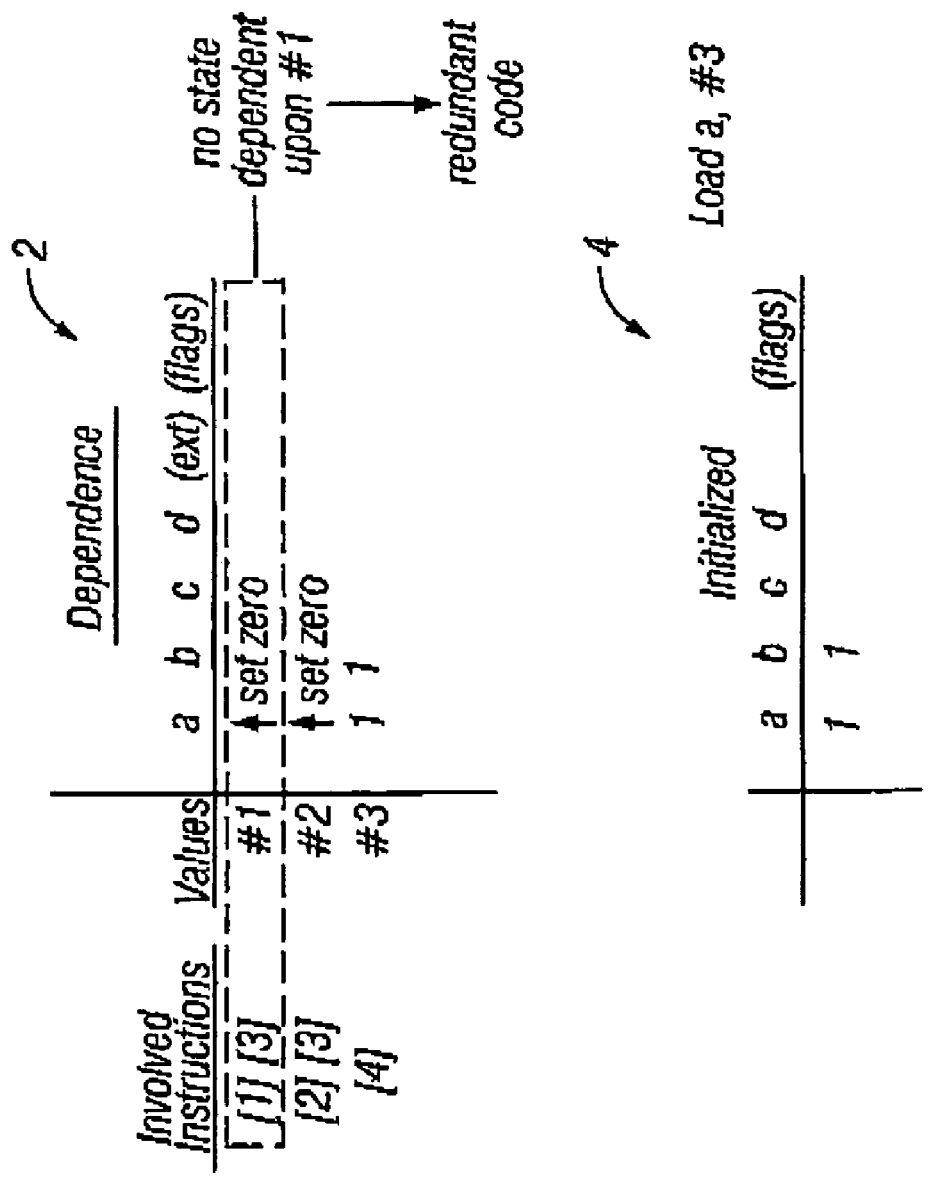
Figure 6:
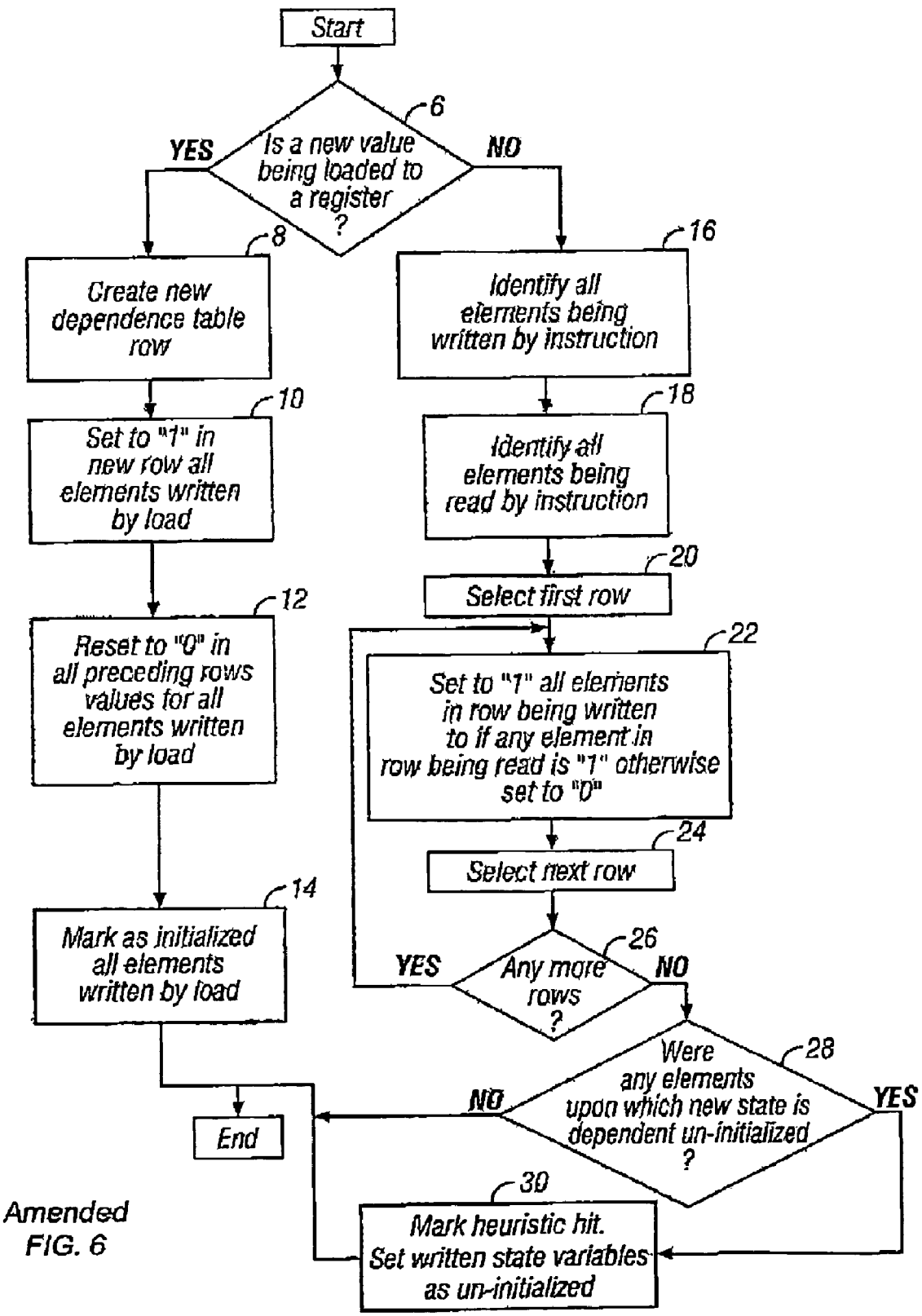
Figure 7:
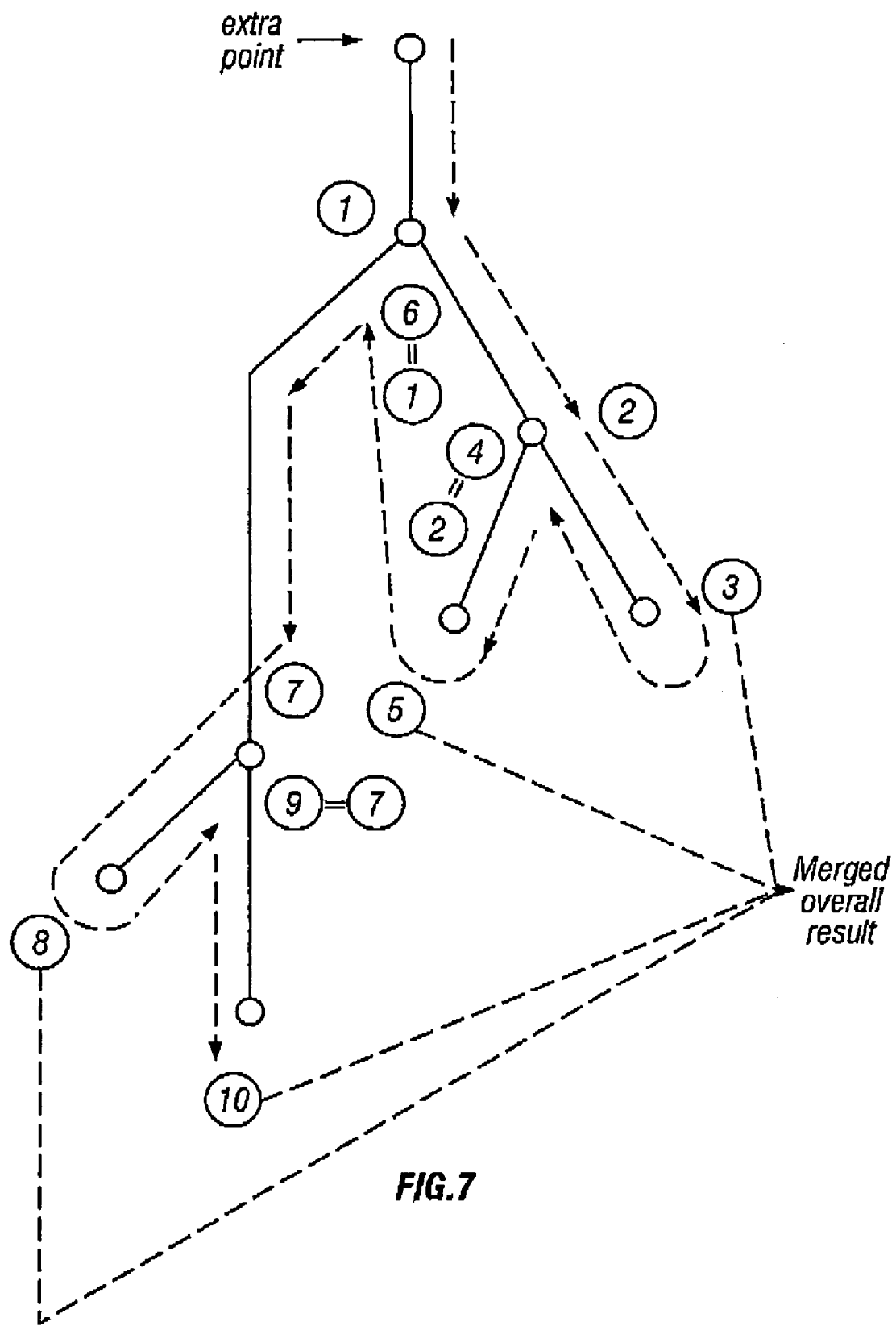
Figure 8:
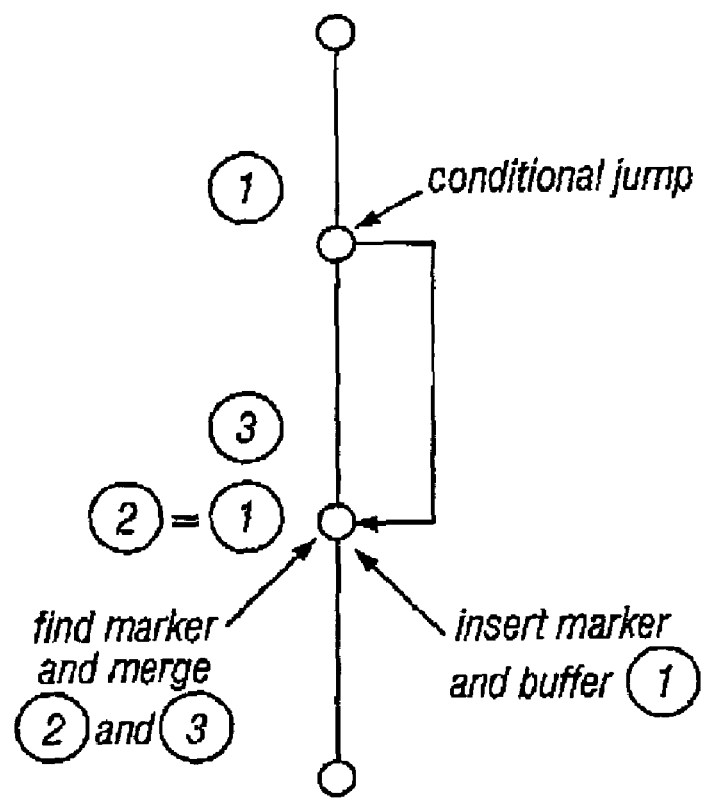
Figure 9A:
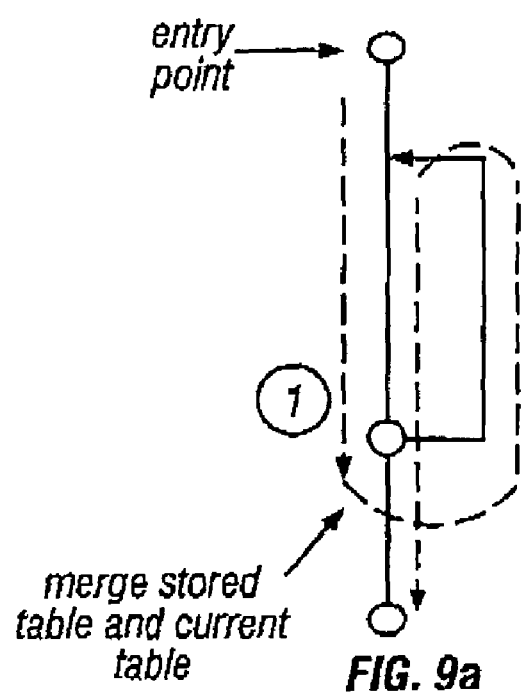
FIG. 9A illustrates the parsing in the case of a loop. This loop may in execution be traversed many times, but for the purpose of parsing is executed twice with both tables being buffered at the first branch and then merged in when that point is reached again in the next pass through the loop.
Figure 10:
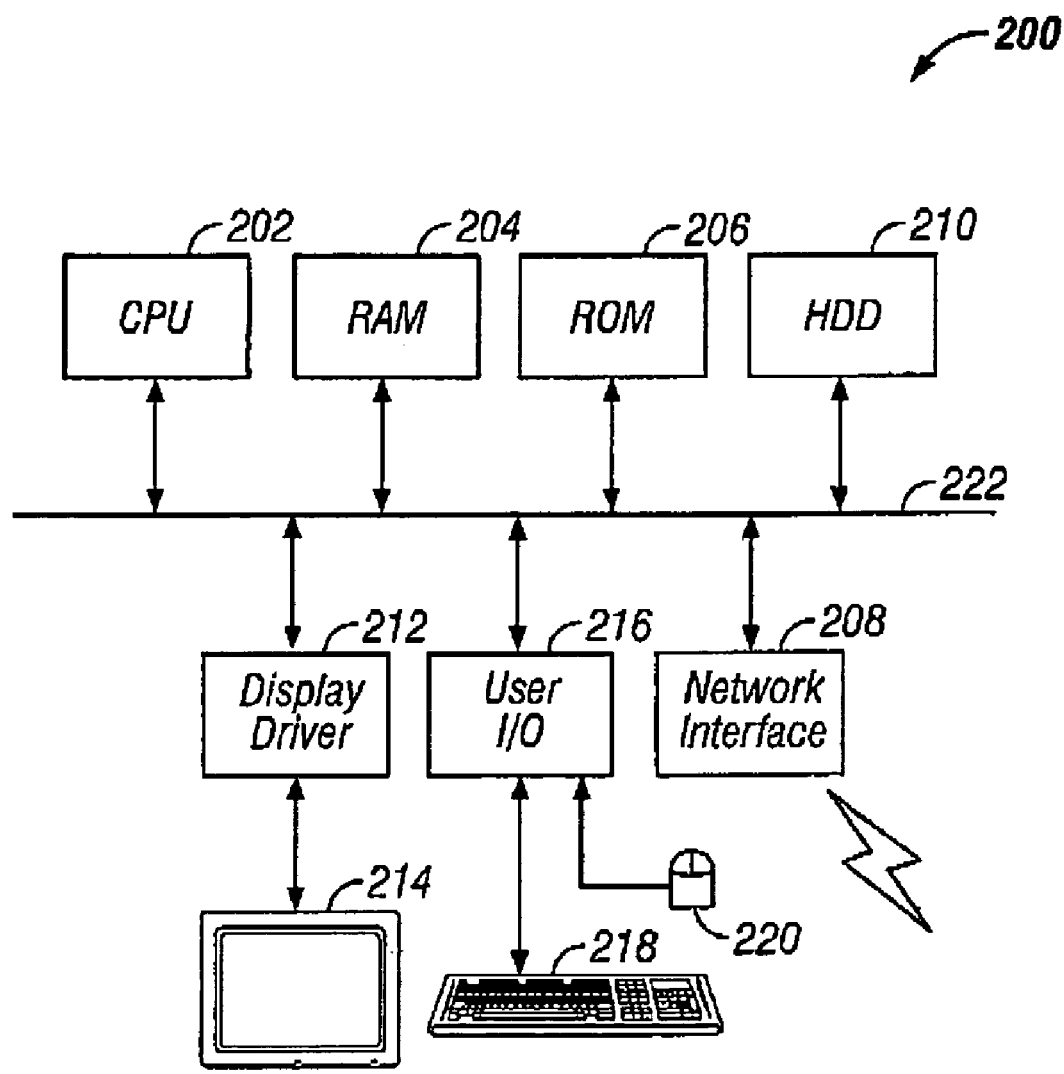

FIG. 10 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 10 is only one example, e.g. a server may not have a screen and a mouse or keyboard.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product for controlling a computer to detect an executable computer program containing a computer virus, said computer program product comprising:
    analysis logic for analyzing program instructions forming said executable computer program to identify suspect program instructions being at least one of:
    (i) a program instruction generating a result value not used by another portion of said executable computer program; and
    (ii) a program instruction dependent upon an uninitialised variable; and
    detecting logic for detecting said executable computer program as containing a computer virus if a number of suspect program instructions identified for said executable computer program exceeds a threshold level, wherein said analysis logic includes a dependence table indicating dependency between state variables within said computer and loaded variable values, and for each program instruction said analysis logic makes a determination as to which state variables are read and written by that program instruction and for each loaded variable value within said dependence table if any state variable read by that program instruction is marked as dependent upon said loaded variable value, then all state variables written by that program instruction are marked as dependent upon said loaded variable value with previous dependencies being cleared, and said analysis logic parses said executable computer program for suspect program instructions by following execution flow and upon occurrence of a branch first following a first branch path having saved pending analysis results and subsequently returning to follow a second branch path having restored said pending analysis results;
    wherein a state variable is marked as initialised upon occurrence of one of:
    (i) a write to said state variable of a determined initialised value; and
    (ii) use of said state variable as a memory address value by a program instruction;
    wherein a branch path stops being followed when one of the following occurs:
    (i) there are no further suitable program instruction for execution within that branch path; and
    (ii) said branch path rejoins a previously parsed execution path;
    wherein said analysis logic includes an initialisation table indicating which state variables have been initialised:
    wherein said dependence table includes a column for each register within a processor, an external write, and a write to a flag value; and a plurality of rows with each row corresponding to a value loaded into said computer that influences a state of said computer:
    wherein said initialisation table includes a column for each register within said processor indicating whether each register is initialised.

2. A computer program product as claimed in claim 1, wherein said computer virus is a polymorphic computer virus.

3. A computer program product as claimed in claim 1, wherein for each program instruction said analysis logic makes a determination as to which state variables are read by that program instruction to produce a read-mask.

4. A computer program product as claimed in claim 1, wherein for each program instruction said analysis logic makes a determination as to which state variables are written by that program instruction to produce a write-mask.

5. A computer program product as claimed in claim 1, wherein said state variables include at least one of:
    (i) register values;
    (ii) processing result flag values; and
    (iii) a flag indicative of a write to a non-register storage location.

6. A computer program product as claimed in claim 1, wherein if said threshold level is exceeded, then further virus detection mechanisms are triggered to confirm the presence of a computer virus.

7. A computer program product as claimed in claim 1, wherein if two different branch paths reach a common point said different branch paths are treated as separate branch paths.

8. A computer program product as claimed in claim 1, wherein upon reaching a conditional jump, said dependence table and said initialisation table are buffered; and upon reaching a target point of said conditional jump, a current version of said dependence table and said initialisation table and a previously buffered version of said dependence table and said initialisation table are merged.

9. A computer program product as claimed in claim 1, wherein upon reaching a loop, said dependence table and said initialisation table are buffered, where said dependence table and said initialisation table are merged during a next pass through said loop.

10. A method of detecting an executable computer program containing a computer virus, said method comprising the steps of:
    analysing program instructions forming said executable computer program to identify suspect program instructions being at least one of:
    (i) a program instruction generating a result value not used by another portion of said executable computer program; and
    (ii) a program instruction dependent upon an uninitialised variable;
    detecting said executable computer program as containing a computer virus if a number of suspect program instructions identified for said executable computer program exceeds a threshold level;
    maintaining a dependence table indicating dependency between state variables within said computer and loaded variable values, wherein for each program instruction a determination is made as to which state variables are read and written by that program instruction and, for each loaded variable value within said dependence table, if any state variable read by that program instruction is marked as dependent upon said loaded variable value, then all state variables written by that program instruction are marked as dependent upon said loaded variable value with previous dependencies being cleared; and
    parsing said executable computer program for suspect program instructions by following execution flow and upon occurrence of a branch first following a first branch path having saved pending analysis results and subsequently returning to follow a second branch path having restored said pending analysis results;

wherein a state variable is marked as initialised upon occurrence of one of:
(i) a write to said state variable of a determined initialised value; and
(ii) use of said state variable as a memory address value by a program instruction;

wherein a branch path stops being followed when one of the following occurs:
(i) there are no further suitable program instruction for execution within that branch path; and
(ii) said branch path rejoins a previously parsed execution path;

wherein an initialisation table is included for indicating which state variables have been initialised;

wherein said dependence table includes a column for each register within a processor, an external write, and a write to a flag value; and a plurality of rows with each row corresponding to a value loaded into said computer that influences a state of said computer;

wherein said initialisation table includes a column for each register within said processor indicating whether each register is initialised.

11. A method as claimed in claim 10, wherein said computer virus is a polymorphic computer virus.

12. A method as claimed in claim 10, wherein for each program instruction a determination is made as to which state variables are read by that program instruction to produce a read-mask.

13. A method as claimed in claim 10, wherein for each program instruction a determination is made as to which state variables are written by that program instruction to produce a write-mask.

14. A method as claimed in claim 10, wherein said state variables include at least one of:
(i) register values;
(ii) processing result flag values; and
(iii) a flag indicative of a write to a non-register storage location.

15. A method as claimed in claim 10, wherein if said threshold level is exceeded, then further virus detection mechanisms are triggered to confirm the presence of a computer virus.

16. Apparatus for detecting an executable computer program containing a computer virus, said apparatus comprising:
an analyser for analysing program instructions forming said executable computer program to identify suspect program instructions being at least one of:
(i) a program instruction generating a result value not used by another portion of said executable computer program; and
(ii) a program instruction dependent upon an uninitialised variable; and
a detector operable to detect said executable computer program as containing a computer virus if a number of suspect program instructions identified for said executable computer program exceeds a threshold level, wherein said analyser includes a dependence table indicating dependency between state variables within said computer and loaded variable values, wherein for each program instruction said analyser makes a determination as to which state variables are read and written by tat program instruction and for each loaded variable value within said dependence table if any state variable read by that program instruction is marked as dependent upon said loaded variable value, then all state variables written by that program instruction are marked as dependent upon said loaded variable value with previous dependencies being cleared, and said analyser parses said executable computer program for suspect program instructions by following execution flow and upon occurrence of a branch first following a first branch path having saved pending analysis results and subsequently returning to follow a second branch path having restored said pending analysis results;

wherein a state variable is marked as initialised upon occurrence of one of:
(i) a write to said state variable of a determined initialised value; and
(ii) use of said state variable as a memory address value by a program instruction;

wherein a branch path stops being followed when one of the following occurs:
(i) there are no further suitable program instruction for execution within that branch path; and
(ii) said branch path rejoins a previously parsed execution path;

wherein an initialisation table is included for indicating which state variables have been initialised;

wherein said dependence table includes a column for each register within a processor, an external write, and a write to a flag value; and a plurality of rows with each row corresponding to a value loaded into said computer that influences a state of said computer;

wherein said initialisation table includes a column for each register within said processor indicating whether each register is initialised.

17. Apparatus as claimed in claim 16, wherein said computer virus is a polymorphic computer virus.

18. Apparatus as claimed in claim 16, wherein for each program instruction said analyser makes a determination as to which state variables are read by that program instruction to produce a read-mask.

19. Apparatus as claimed in claim 16, wherein for each program instruction said analyser makes a determination as to which state variables are written by that program instruction to produce a write-mask.

20. Apparatus as claimed in claim 16, wherein said state variables include at least one of:
(i) register values;
(ii) processing result flag values; and
(iii) a flag indicative of a write to a non-register storage location.

21. Apparatus as claimed in claim 16, wherein if said threshold level is exceeded, then further virus detection mechanisms are triggered to confirm the presence of a computer virus.

* * * * *

UNITED STATES PATENT AND TRADEMARK OFFICE
CERTIFICATE OF CORRECTION

| | | |
|---|---|---|
| PATENT NO. | : 7,266,844 B2 | Page 1 of 1 |
| APPLICATION NO. | : 09/963659 | |
| DATED | : September 4, 2007 | |
| INVENTOR(S) | : Teblyashkin et al. | |

It is certified that error appears in the above-identified patent and that said Letters Patent is hereby corrected as shown below:

In the claims:
col. 7, line 59 replace "initialised:" with --initialised;--;
col. 7, line 64 replace "computer:" with --computer;--:
col. 10, line 5 replace "tat" with --that--.

Signed and Sealed this

Second Day of February, 2010

David J. Kappos
*Director of the United States Patent and Trademark Office*